Nov. 15, 1960   E. J. BRAJER ET AL   2,960,411
DIELECTRIC CERAMIC COMPOSITIONS
Filed Aug. 25, 1958

INVENTOR
EDWIN J. BRAJER
FRANK KULCSAR
BY
ATTORNEY

2,960,411
DIELECTRIC CERAMIC COMPOSITIONS

Edwin J. Brajer, Chicago, Ill., and Frank Kulcsar, Fairview Park, Ohio, assignors to Clevite Corporation, Cleveland, Ohio, a corporation of Ohio Filed Aug. 25, 1958, Ser. No. 756,759

10 Claims. (Cl. 106—39)

This invention relates to ceramic compositions of matter and more particularly to high permittivity polycrystalline ceramic capacitor dielectrics.

It is well known that ceramic capacitors, while more durable and less expensive than other types, e.g., paper and electrolytic, suffer from certain shortcomings among the more serious of which are lack of stability over wide temperature ranges, low specific capacity, and/or insufficient resistivity at high temperatures.

The present invention contemplates improved dielectric ceramic compositions consisting essentially of solid solutions of lead titanate and lead zirconate and containing relatively large amounts of strontium and/or calcium and relatively small quantities of at least one component selected from the group consisting of niobium, tantalum and the rare earth metals, as hereinafter described in detail.

It is an object of the present invention to overcome at least one of the problems of the prior art relating to ceramic capacitors.

A more particular object of the invention is the provision of novel ceramic compositions characterized by good mechanical and dielectric strength, high permittivity, and good temperature stability of dielectric constant.

A further object of the invention is the provision of improved ceramic capacitors having high space factor and capable of satisfactory operation at high temperatures.

Figure 2:
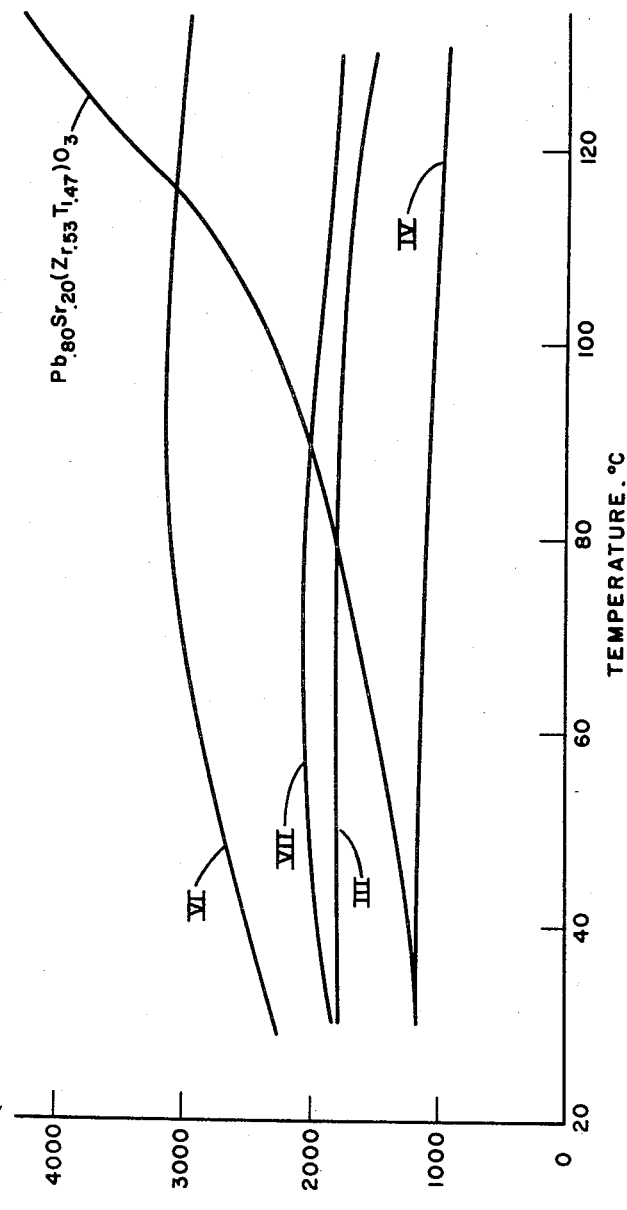
Figure 1:
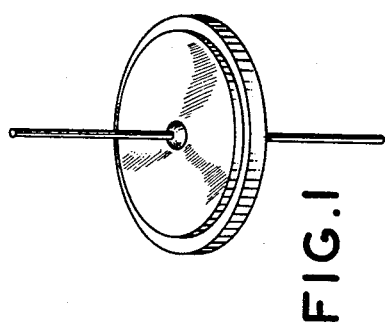

These and further objects of the invention, its advantages, scope, and the manner in which it may be practiced will be readily apparent to those conversant with the art from the following description and subjoined claims to be read in conjunction with the annexed drawing in which Figure 1 is a perspective view of a ceramic capacitor embodying the present invention;

Figure 2 is a graphic representation of the temperature variation of dielectric constant for exemplary ceramic compositions according to the present invention.

Referring to Figure 1, 10 designates generally a ceramic capacitor illustrated in stereotyped form. Capacitor 10 consists of a disk 12 of dielectric ceramic material interposed between electrodes 14 and 16, suitably applied to the major faces of the disk. Each electrode is provided with a respective conductive lead, 18 and 20 secured thereto in any suitable manner.

In accordance with the present invention, disk 12 consists of a polycrystalline ceramic aggregate of particular constituencies as will now be pointed out.

The basic ingredients of the ceramic composition are lead, zirconium and titanium in oxidic form combined in solid solution in proportions corresponding to lead zirconate and lead titanate.

As shown by U.S. Patent No. 2,708,244 to Bernard Jaffe, ceramic solid solutions of lead zirconate titanate, in themselves, are known in the art. They have a perovskite or pseudo-cubic lattice structure and, in certain mol ratios, are ferroelectric, exhibiting a remarkably high electro-mechanical coupling when electrostatically polarized. Accordingly, lead zirconate titanate and certain chemical modifications are highly desirable transducer materials.

It has been discovered that ceramic dielectric materials can be made by chemically modifying lead zirconate titanate ceramics so as to vastly increase its relative permittivity (dielectric constant, K), its high temperature D.-C. resistivity, to decrease the temperature dependence of the permittivity, and to eliminate its piezoelectric activity.

Polycrystalline ceramics in accordance with the invention have the type formula $ABO_3$ and may be considered as derived from lead zirconate titanate $Pb(Zr,Ti)O_3$ by substitution of strontium and/or calcium for 25 to 40 atom percent of the lead. The ratio of Zr to Ti atoms is important and may vary from 45:55 to 75:25.

Thus the basic compositions contemplated by the present invention may be represented by the general empirical formula $$Pb_aSr_bCa_c(Zr_x,Ti_y)O_3 \qquad (1)$$

wherein $$a = 0.60 \text{ to } 0.75$$
$$b+c = 0.40 \text{ to } 0.25$$
$$a+b+c = 1.00$$
$$x = 0.45 \text{ to } 0.75$$
$$y = 0.55 \text{ to } 0.25$$
$$x+y = 1.00$$

The basic compositions denoted by Formula 1 are characterized by high permittivities and low dissipation as illustrated by the following specific examples:

| Example No. | Composition | Dielectric Constant, K, at 25° C. | Dissipation, Percent |
|---|---|---|---|
| I | $Pb_{0.75}Sr_{0.25}(Zr_{0.53}Ti_{0.47})O_3$ | 2,160 | 0.8 |
| II | $Pb_{.70}Sr_{.30}(Zr_{0.53}Ti_{.47})O_3$ | 2,350 | 0.6 |
| III | $Pb_{.65}Sr_{.35}(Zr_{0.53}Ti_{.47})O_3$ | 1,981 | 0.4 |
| IV | $Pb_{.60}Sr_{.40}(Zr_{0.53}Ti_{.47})O_3$ | 1,170 | 0.3 |

The extent of substitution of Sr, Ca for Pb is critical in its effect on permittivity. Thus it will be noted from a comparison of Examples III and IV that the dielectric constant drops from 1981 to 1150 when the Sr is increased from 35 to 40 atom percent. Composition IV, however, despite its relatively low dielectric constant, is desirable because of extremely low temperature dependence of permittivity as hereinafter described. Such is not the case of compositions with less than 25 atom percent Sr, Ca; below this limit not only is the dielectric constant degraded but also the temperature stability.

Varying the Zr:Ti ratio of the compositions also has a pronounced effect. As shown by the following examples, the highest dielectric constant is obtained with a Zr:Ti atom ratio of 50:50.

| Example No. | Composition | Dielectric Constant K, at 25° C. |
|---|---|---|
| V | $Pb_{.70}Sr_{.30}(Zr_{.40}Ti_{.60})O_3$ | 1,095 |
| VI | $Pb_{.70}Sr_{.30}(Zr_{.50}Ti_{.50})O_3$ | 2,370 |
| VII | $Pb_{.70}Sr_{.30}(Zr_{.60}Ti_{.40})O_3$ | 2,085 |
| VIII | $Pb_{.70}Sr_{.30}(Zr_{.70}Ti_{.30})O_3$ | 1,900 |

The compositions represented by Formula 1 may be further improved by the addition of small amounts, i.e., up to 4 atom percent in the aggregate of one or more of the rare earth elements, niobium, and/or tantalum.

Thus an addition of 3 atom percent of lanthanum to composition II, results in an increase of dielectric constant at 25° C. from 2350 to 3650. Similarly, an addition of 3 atom percent of niobium to the same composition, results in an increase of dielectric constant to 3250. It is assumed that the rare earth additions as exemplified by La replace Pb and/or the alkaline earths in the lattice whereas Nb and Ta replace Ti and Zr.

The formula and dielectric constants of these and additional examples of compositions according to the present invention are as follows:

| Example No. | Composition | Dielectric Constant K, at 25° C. |
|---|---|---|
| IX | $Pb_{.70}Sr_{.29}La_{.01}(Zr_{.53}Ti_{.47})O_3$ | 2,860 |
| X | $Pb_{.70}Sr_{.27}La_{.03}(Zr_{.53}Ti_{.47})O_3$ | 3,650 |
| XI | $Pb_{.70}Sr_{.30}(Zr_{.524}Ti_{.465}Nb_{.01})O_3$ | 3,129 |
| XII | $Pb_{.70}Sr_{.30}(Zr_{.515}Ti_{.455}Nb_{.03})O_3$ | 3,244 |

As previously mentioned, compositions according to the present invention may be represented by the type formula $ABO_3$. Thus it will be understood from the foregoing description that, in this formula, "A" may consist, in mol fractions or atom percent, of 0.60 to 0.75 lead, 0.25 to 0.40 of at least one alkaline earth element from the group consisting of strontium and calcium, the mol fractions of lead and alkaline earth elements totaling at least 0.96, the balance, if any, of "A" being composed essentially of at least one rare earth metal. The "B" component may consist of 0.25 to 0.55 titanium, 0.45 to 0.75 zirconium, the mol fractions of titanium and zirconium totaling at least 0.96, the balance, if any, of "B" being composed essentially of at least one element from the group consisting of niobium and tantalum.

While the absolute value of dielectric constant at room temperature is a prime consideration in evaluating dielectric materials, it is equally important that this value remain relatively constant over a range of ambient temperatures. Many dielectric ceramic materials are known which have peak dielectric constants in excess of 4000 at particular temperatures known as the Curie point. The extreme non-linearity of the dielectric constant renders these materials useless as normal capacitor dielectrics. The ceramic materials encompassed by the present invention are remarkable in that they combine high dielectric constant with temperature stability. The variation of dielectric constant with temperature for example composition numbers III, IV, VI and VII is graphically presented in Figure 2 from which it will be readily apparent that variation is relatively small from room temperature up about 140° C. The critical effect of the Pb: alkaline earth element ratio extends also to the temperature stability of dielectric constant. To demonstrate this effect and to present a basis for comparison, Figure 2 includes a curve for the composition:

$$Pb_{0.80}Sr_{0.20}(Zr_{0.53}Ti_{0.47})O_3$$

This material has a dielectric constant of around 4500 at 180° C. but, at room temperature, K=1200 and the temperature variation of K amounts to +450% between 30° and 180° C. On the other hand compositions according to the invention have somewhat lower but far more stable dielectric constants in the range 30° to 180° C. For example, the temperature variation of K in this range is only about ±15% of the average K for composition III.

Also plotted in Figure 2 is a curve for the composition IV which is of interest because of the extreme stability of its dielectric constant from room temperature up to about 120° C. For applications where stability is more important than the utmost in dielectric constant, composition IV is highly desirable.

Another important property of dielectric ceramic materials is their resistivity, both at room temperature and elevated temperatures. Compositions according to the present invention are excellent in this respect also. Compositions without the niobium, tantalum or rare earth metal additions, e.g., examples numbers II and III, had a volume resistivity at 125° C. of about $10^8$ ohm-cm. after 1000 hours' exposure to fields of 10 volts per mil. After such exposure the room temperature resistivity was about $10^{12}$ ohm-cm.

Additions of the rare earth metals, niobium and/or tantalum have the effect of increasing the high temperature resistivity. Thus, compositions numbers X and XII had resistivities of about $10^{11}$ ohm-cm. under the field and temperature conditions set forth above. The room temperature resistivity remains the same, i.e., about $10^{12}$ ohm-cm.

The compositions described herein may be prepared in accordance with various well known ceramic procedures. The following method gives entirely satisfactory results:

Lead oxide (PbO), zirconia ($ZrO_2$) and titania ($TiO_2$), all of relatively pure grade (e.g., chemically pure) are combined in the proper proportions together with strontium and/or calcium in the form of the oxide or carbonate. The Sr and Ca carbonates are preferred because of their ready commercial availability at relatively low cost and in suitable purity. The combined ingredients are wet or dry milled to achieve thorough mixing and particle size reduction.

After the first milling, the mixture is dried (if wet milled) and reground sufficiently to assure as homogeneous a mixture as possible. At this stage the rare earth elements, niobium and/or tantalum, are added in the form of their respective oxides and thoroughly admixed. Thereafter, the mixture is calcined at a temperature of around 850° C. for approximately two hours. The calcined mixture, after cooling, is then crushed and milled to a small particle size, e.g., average 1 to 2 microns. When milling is completed the mix is ready to be formed into desired shapes and fired to maturity.

The data given herein was obtained from test disks pressed from the mix described admixed with a small amount of water or other suitable binder such as Ceremul C. Ceremul C is a commercially available product consisting of an aqueous dispersion (41 to 46% solids) of paraffin (M.P. 122° F.). The disks were fired to maturity at a rate not exceeding 200° C. per hour to a peak temperature of between 1350 and 1430° C. Because of the volatile nature of lead compounds at temperatures above 1000° C., the test disks were enclosed during firing in covered crucibles containing a source of lead vapor. The preferred procedure is generally the same as that described in abandoned applications Ser. Nos. 550,868 and 550,869 of F. Kulcsar, filed December 5, 1955, and assigned to the same assignee as the present invention. Reference may be had to these applications for additional details. It is to be understood, however, that the particular ceramic procedure employed in the formulation, compounding and firing of the ceramic compositions described are not germane to the present invention; any satisfactory ceramic techniques may be employed.

While there have been described what at present are believed to be the preferred embodiments of this invention, it will be obvious to those skilled in the art that various changes and modifications may be made therein without departing from the invention, and it is aimed, therefor, to cover in the appended claims all such changes and modifications as fall within the true spirit and scope of the invention.

We claim:
1. A polycrystalline dielectric ceramic composition having the type formula $ABO_3$,

A consisting, in mol fractions, of:
    0.60 to 0.75 lead,
    0.25 to 0.40 of at least one alkaline earth element from the group consisting of strontium and calcium, the mol fractions of lead and alkaline earth elements totaling at least 0.96, any balance of A being composed essentially of at least one rare earth element;

B consisting, in mol fractions, of:
0.25 to 0.55 titanium;
0.45 to 0.75 zirconium, the mol fractions of titanium and zirconium totaling at least 0.96, any balance of B being composed essentially of at least one element from the group consisting of niobium and tantalum.

2. A polycrystalline dielectric ceramic composition consisting essentially of lead, zirconium, titanium, oxygen, and at least one additional ingredient selected from the group consisting of strontium and calcium, the constituents of said compositions being combined, effectively in solid solution in the form of zirconates and titanates as indicated by the formula $$Pb_aSr_bCa_c(Zr_xTi_y)O_3$$

wherein
$a = 0.60$ to $0.75$
$b+c = 0.40$ to $0.25$
$x = 0.45$ to $0.75$
$a+b+c = x+y = 1.00$ 3. A polycrystalline dielectric ceramic composition consisting essentially of lead, strontium, zirconium titanium, oxygen and an additional ingredient M, consisting of at least one of the rear earth elements, the constituents of said compositions being combined, effectively in solid solution in the form and molar proportions indicated by the formula $$Pb_aSr_bM_c(Zr_xTi_y)O_3$$

wherein
$a = 0.60$ to $0.75$
$c = 0.01$ to $0.04$
$x = 0.45$ to $0.75$
$a+b+c = x+y = 1.00$ 4. A polycrystalline dielectric ceramic composition consisting essentially of lead, strontium, zirconium, titanium, oxygen and an additional ingredient M', consisting of at least one member of the group consisting of niobium and tantalum, the constituents of said compositions being combined, effectively in solid solution in the form and molar proportions indicated by the formula $$Pb_aSr_b(Zr_xTi_yM'_z)O_3$$

wherein
$a = 0.60$ to $0.75$
$x = 0.45$ to $0.75$
$x = 0.01$ to $0.04$
$a+b = x+y+z = 1.00$ 5. A capacitor comprising a dielectric made up of a polycrystalline dielectric ceramic composition having the type formula $ABO_3$, A consisting, in mol fractions, of:
0.60 to 0.75 lead,
0.25 to 0.40 of at least one alkaline earth element from the group consisting of strontium and calcium, the mol fractions of lead and alkaline earth elements totaling at least 0.96, any balance of A being composed essentially of at least one rare earth element;

B consisting, of mol fractions, of:
0.25 to 0.55 titanium;
0.45 to 0.75 zirconium, the mol fractions of titanium and zirconium totaling at least 0.96, any balance of B being composed essentially of at least one element from the group consisting of niobium and tantalum.

6. A polycrystalline dielectric ceramic material having substantially the composition indicated by the formula $Pb_{.70}Sr_{.27}La_{.03}(Zr_{.53}Ti_{.47})O_3$.

7. A polycrystalline dielectric ceramic material having substantially the composition indicated by the formula $Pb_{.70}Sr_{.30}(Zr_{.515}Ti_{.455}Nb_{.03})O_3$.

8. A polycrystalline dielectric ceramic material having substantially the composition indicated by the formula $Pb_{.70}Sr_{.30}(Zr_{.50}Ti_{.50})O_3$.

9. A polycrystalline dielectric ceramic material having substantially the composition indicated by the formula $Pb_{.70}Sr_{.30}(Zr_{.53}Ti_{.47})O_3$.

10. A polycrystalline dielectric ceramic material having substantially the composition indicated by the formula $Pb_{.70}Sr_{.30}(Zr_{.60}Ti_{.40})O_3$.

References Cited in the file of this patent

UNITED STATES PATENTS

| | | |
|---|---|---|
| 2,708,244 | Jaffe | May 10, 1955 |
| 2,855,317 | McQuarrie | Oct. 7, 1958 |
| 2,911,370 | Kulcsar | Nov. 3, 1959 |

FOREIGN PATENTS

| | | |
|---|---|---|
| 574,577 | Great Britain | Jan. 11, 1946 |

OTHER REFERENCES

Johnson et al.: J. Amer. Ceram. Soc., vol. 32, No. 12, December 1949 (pages 398–401).